(12) United States Patent
Arnold et al.

(10) Patent No.: US 10,769,360 B1
(45) Date of Patent: Sep. 8, 2020

(54) APPARATUS AND METHOD FOR PROCESSING AN ELECTRONIC DOCUMENT TO DERIVE A FIRST ELECTRONIC DOCUMENT WITH ELECTRONIC-SIGN ITEMS AND A SECOND ELECTRONIC DOCUMENT WITH WET-SIGN ITEMS

(71) Applicant: Snapdocs, Inc., San Francisco, CA (US)

(72) Inventors: Evan Arnold, San Francisco, CA (US); Jonathan Tang, San Francisco, CA (US); Jeffrey Scott Breudecheck, San Francisco, CA (US); Isaac Selkow, San Francisco, CA (US); Jacob Moffatt, San Francisco, CA (US)

(73) Assignee: Snapdocs, Inc., San Francisco, CA (US)

( * ) Notice: Subject to any disclaimer, the term of this patent is extended or adjusted under 35 U.S.C. 154(b) by 0 days.

(21) Appl. No.: 16/371,524

(22) Filed: Apr. 1, 2019

(51) Int. Cl.
*G06F 40/174* (2020.01)
*G06K 9/00* (2006.01)

(52) U.S. Cl.
CPC ....... *G06F 40/174* (2020.01); *G06K 9/00161* (2013.01); *G06K 9/00456* (2013.01); *G06K 2209/01* (2013.01); *G06K 2209/27* (2013.01)

(58) Field of Classification Search
CPC .............. G06F 40/174; G06K 9/00161; G06K 9/00456; G06K 2209/01; G06K 2209/27
USPC ....................................................... 715/224
See application file for complete search history.

(56) References Cited

U.S. PATENT DOCUMENTS

| 2005/0210048 | A1* | 9/2005 | Beres | G06F 16/258 |
| 2006/0259440 | A1* | 11/2006 | Leake | G06Q 10/10 705/76 |
| 2008/0209313 | A1* | 8/2008 | Gonser | G06F 40/186 715/255 |

(Continued)

*Primary Examiner* — Stephen S Hong
*Assistant Examiner* — Hope C Sheffield
(74) *Attorney, Agent, or Firm* — Cooley LLP (57) ABSTRACT

An apparatus has a processor and a memory connected to a bus. The memory stores instructions executed by the processor to receive an electronic document from a network. Image processing segments are formed. The image processing segments are processed to generate classification data including text strings. Image processing segments are also processed to identify signing items such as signature lines, date and text fields, checkboxes, and radio-buttons. Each signing item is categorized as an electronic-sign item or a wet-sign item. A first electronic document is produced with pages from the electronic document that have electronic-sign items and a second electronic document is produced with pages from the electronic document that have wet-sign items. The first electronic document is augmented with metadata characterizing locations of and any conditional logic associated with the electronic-sign items. A signer identification code is also included for each item to indicate which signer the item applies to in the case of multiple signers. The first electronic document is sent to the network for delivery to a machine supporting an electronic signing service. The second electronic document is sent to the network for delivery to a client machine.

4 Claims, 5 Drawing Sheets

(56) References Cited

U.S. PATENT DOCUMENTS

2011/0276875 A1* 11/2011 McCabe ............... G06F 40/197
715/255
2020/0005032 A1* 1/2020 Freed ..................... G06Q 10/10

* cited by examiner

APPARATUS AND METHOD FOR PROCESSING AN ELECTRONIC DOCUMENT TO DERIVE A FIRST ELECTRONIC DOCUMENT WITH ELECTRONIC-SIGN ITEMS AND A SECOND ELECTRONIC DOCUMENT WITH WET-SIGN ITEMS

FIELD OF THE INVENTION

This invention relates generally to processing electronic documents in a computer network. More particularly, this invention relates to techniques for processing an electronic document to derive a first electronic document with electronic-sign items and a second electronic document with wet-sign items.

BACKGROUND OF THE INVENTION

Traditionally, business and legal documents have been paper based. There is a growing demand for the utilization of electronic documents, which can be easily communicated over computer networks. An electronic document may have various signing items, such as signature lines, date and text fields, checkboxes, and radio-buttons. Some of these items need to be wet-signed (e.g., using a pen with ink), while others can be electronically signed or e-signed using a computer automated service, such as DocuSign®, Hello-Sign® or Adobe Sign®. There is a need to automate the recognition of the different types of signing items and to create electronic document packages with metadata of the signing items.

SUMMARY OF THE INVENTION

An apparatus has a processor and a memory connected to a bus. The memory stores instructions executed by the processor to receive an electronic document from a network. Image processing segments are formed. The image processing segments are processed to generate classification data including text strings. Image processing segments are also processed to identify signing items such as signature lines, date and text fields, checkboxes, and radio-buttons. Each signing item is categorized as an electronic-sign item or a wet-sign item. A first electronic document is produced with pages from the electronic document that have electronic-sign items and a second electronic document is produced with pages from the electronic document that have wet-sign items. The first electronic document is augmented with metadata characterizing locations of and any conditional logic associated with the electronic-sign items. A signer identification code is also included for each item to indicate which signer the item applies in the case of multiple signers. The first electronic document is sent to the network for delivery to a machine supporting an electronic signing service. The second electronic document is sent to the network for delivery to a client machine.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
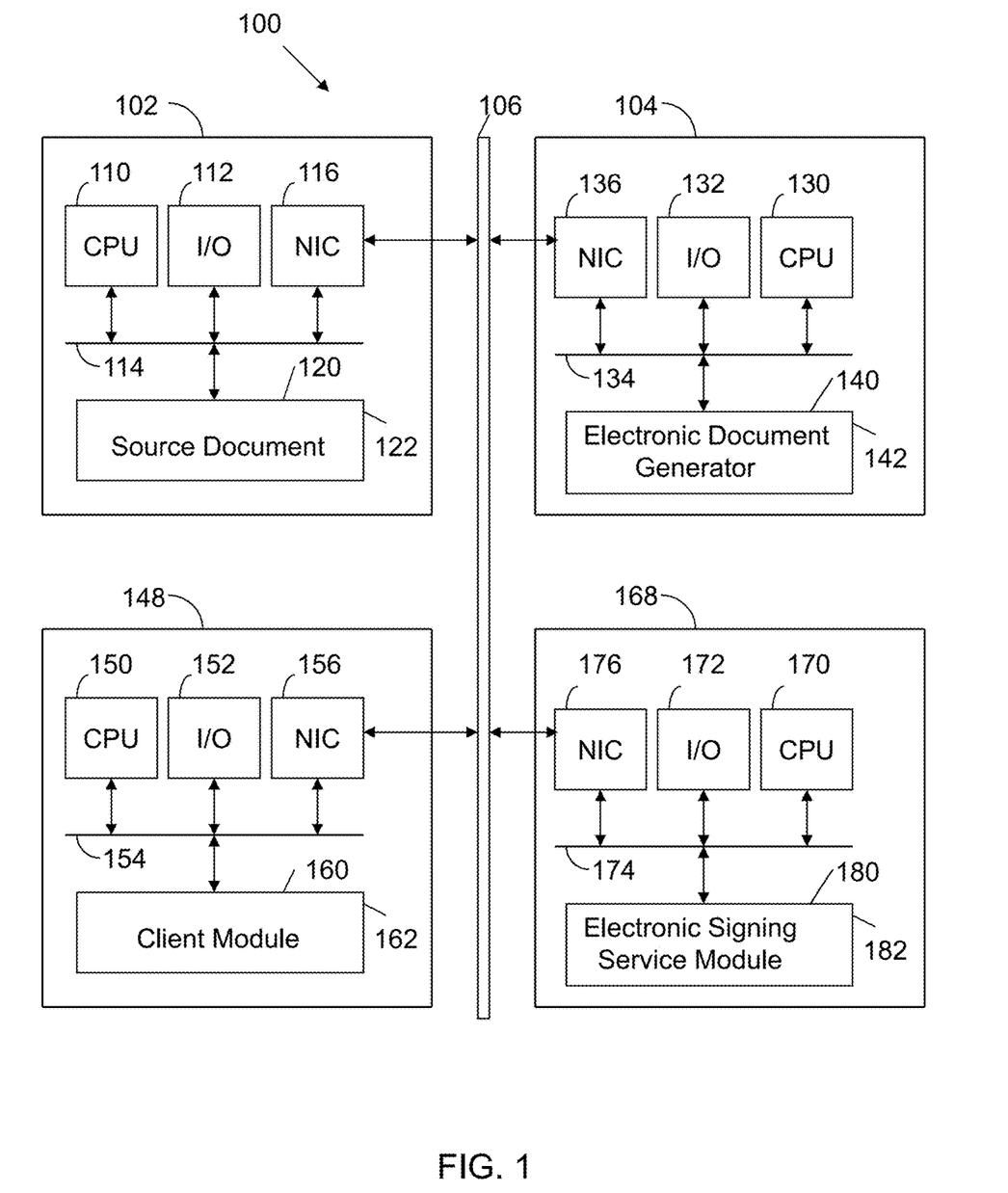
FIG. 1 illustrates a system configured in accordance with an embodiment of the invention.

FIG. 1 illustrates a system 100 configured in accordance with an embodiment of the invention. The system 100 includes a first machine 102 in communication with a second machine 104 via a network 106, which may be any combination of wired and wireless networks. The first machine 102 includes a processor 110 connected to input/output devices 112 via a bus 114. The input/output devices 112 may include a keyboard, mouse, touch display and the like. A network interface circuit 116 is also connected to bus 114 to provide connectivity to network 106. A memory 120 is also connected to the bus 114. The memory 120 stores a source document 122, which is processed in accordance with an embodiment of the invention. The source document 122 is sent via network 106 to second machine 104 for processing.

The second machine 104 includes a processor 130, input/output devices 132, bus 134 and network interface circuit 136. A memory 140 is connected to bus 134. The memory 140 stores an electronic document generator 142 with instructions executed by processor 130 to implement operations disclosed herein. The electronic document generator 142 processes the source document and produces a first electronic document with pages from the source document that have electronic-sign signature lines. The electronic document generator 142 also produces a second electronic document with pages from the source document that have wet-sign signature lines.

The first electronic document may be sent to machine 168, which hosts an electronic signing service. The second electronic document may be sent to machine 148, which has a client module 162 which allows one to open and print the second electronic document. In this way, the first electronic document can be electronically signed and the second electronic document can be printed and then be signed with a pen (wet-sign).

Machine 148 includes a processor 150, input/output devices 152, bus 154 and network interface circuit 156. A memory 160 is connected to bus 154. The memory 162 stores a client module 162 with instructions executed by processor 150 that allows one to open and print the second electronic document. By way of example machine 148 may be owned by an individual signing a real estate lease. The individual uses a pen to sign the wet-sign signature lines within a printed version of the second electronic document. The individual may also use machine 148 to access machine 168, which hosts a service to allow the individual to electronically sign the electronic-sign signing items within the first electronic document.

Machine 168 includes a processor 170, input/output devices 172, bus 174 and network interface circuit 176. A memory 180 stores an electronic signing service module 182 with instructions executed by processor 170 to implement an electronic signing service, such as DocuSign®, HelloSign® or Adobe Sign®.

It should be appreciated that the system 100 is exemplary. Various functions may be combined on individual machines. For example, machine 104 may support both electronic document generation and electronic signing. Similarly, machine 148 may be configured to support a client module and an electronic signing service. It is the operations disclosed herein that are significant. Where those operations are performed in the network is not significant.

Figure 2:
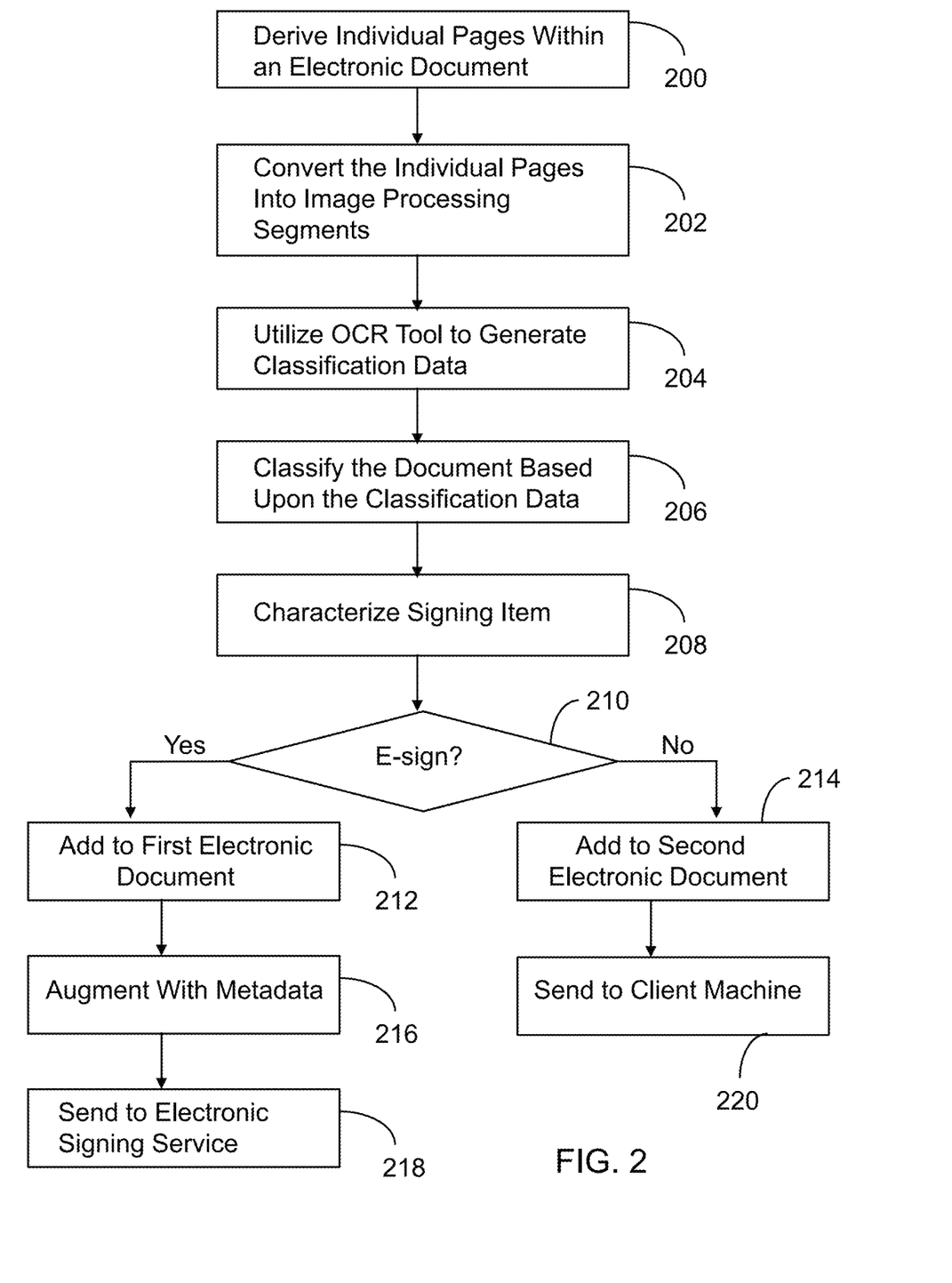
FIG. 2 illustrates processing operations associated with an embodiment of the invention.

FIG. 2 illustrates processing operations performed by the electronic document generator 142. Machine 104 receives an electronic document from network 106, such as source document 122 from machine 102. By way of example, the electronic document is a Portable Document Format (PDF) document, which is an ISO 32000 open format that specifies text formatting and images operative across different application software, hardware and operating systems.

Individual pages within the electronic document are derived 200. For example, a PDF document can be split into individual PDF pages using a resource, such as PDF Toolkit (PDFtk™). The individual pages are then converted into image processing segments 202. In one embodiment, Ghostscript®, an interpreter of PDF documents available at ghostscript.com, is used to convert each PDF page into an image processing segment, such as a high-resolution (e.g., 300 dots per inch) Joint Photographic Experts Group (JPEG) image.

An optical character recognition (OCR) tool is then used to generate classification data 204. In one embodiment, the classification data includes text strings. For example, Google Cloud Vision® may be used to perform optical character recognition to convert the images of text from each page into machine-encoded text.

The classification data is used to classify the document 206. In one embodiment, machine learning models are used to predict document class of each page. An embodiment of the invention is a text-based machine learning model developed using Scikit-Learn™, which is a free software machine learning library. A source document 122 comes from an entity that may be considered a customer utilizing the electronic document generator 142. A customer, say a lender or bank, has a model within the electronic document generator 142 to predict the classes of each of the pages in their PDF packages. For each text-based machine learning model, there may be a vocabulary list of unigrams (single words), bigrams (2 consecutive words), and trigrams (3 consecutive words). Inputs to the text-based machine learning model include a count of the number of occurrences for each of the vocabulary words in addition to a total general word count and a total number count from the page. Given these inputs for a page, the model output is a predicted document class from out of many possible document classes (i.e., closing disclosure, deed of trust, etc).

For some document classes, a secondary image-based machine learning model is used. For example, some documents have watermarks to indicate drafts or sample pages, which cannot be detected using the above approach. In these cases, an image-based machine learning model is applied to further identify the document class of the pages.

Individual signing items are characterized 208. In particular, each signing item is characterized as an electronic-sign item or a wet-sign item. The characterization of any signing item may be based upon the classification of the document or the classification of a page in a document. A client may configure rules as to what types of documents or document pages require an electronic-sign or a wet-sign. Alternately, the characterization of any signing item may be based upon attributes of the item, a configurable rule for a given signer, a default parameter and the like.

Each page with a signing item is then applied to block 210. If the page has an electronic-sign item (210—Yes), the signing item and its accompanying text are added to a first electronic document 212. Otherwise (210—No), the signing items and its accompanying text are added to a second electronic document 214 comprising wet-sign items and accompanying text.

The first electronic document is augmented with metadata 216. The metadata may include information characterizing locations of the electronic-sign items, signing item types, identifications of required signers and conditional logic associated with signing items. The second electronic document may also be augmented with metadata, but since it contains signing items for wet-sign the same metadata is not necessary.

The first electronic document and its associated metadata are then sent to an electronic signing service 218, such as one hosted by machine 168. The second electronic document is sent to a client machine 220, such as machine 148. Alternately, the first electronic document and the second electronic document are sent to client machine 220 and client machine 220 sends the first electronic document and its associated metadata to the signing service, such as one hosted by machine 168.

The electronic document generator 142 includes a set of functions to positively detect signing items such as signature lines, date lines, initial lines, text lines, checkboxes, radio buttons, and radio-groups from an image (e.g., JPEG) of a document. The functions also return the electronic signer identification (esigner_id) of the signer associated with each item and if there is conditional logic that needs to be applied for the items.

In one embodiment the inputs to the electronic document generator 142 include:
1) A mapping of full names of each of the signers who are electronically signing the electronic-sign package with their respective electronic-signer identification (esigner_id) (e.g. {'Steven Signer': 1001, 'Sally Signer': 1002}).
2) The document class of the page to be annotated (e.g., "Closing Disclosure").
3) The page number in the document class (e.g., 3 for the 3rd of 5 pages of the "Closing Disclosure").
4) The URL of the image for the page to be annotated (e.g. "s3://link_to_closing_disclosure_page3_image.jpg").
5) A mapping of all other pages in the electronic-sign package with the URLs of their respective images.
   (e.g. ["closing_disclosure": [{1: "s3://link_to_closing_disclosure_page1_image.jpg", 2: "s3://link_to_closing_disclosure_page2_image.jpg", 3: "s3:i/link_to_closing_disclosure_page3_image.jpg", . . . , "deed_of_trust":[{1: s3://link_to_deed_of_trust_page1_image.jpg", ... }]])

6) The identification (id) of the customer (e.g., bank/lender) for the case of customer-specific documents (e.g. 1003, the id for Bank/Lender of the PDF package)

In one embodiment, the electronic document generator 142 outputs:

1) For each signing item:
   a) The type of signing item (signature, initials, date, text, radio-button, etc.).
   b) The electronic-signer identification (esigner_id) associated with the item.
   c) The top left x,y coordinates and the bottom right x,y coordinates.
   d) If the item is optional/required, viewable only.
   e) Any conditional logic (e.g., If another item needs to be set to a value as a prerequisite for this item to be displayed to the signer).

For example, the output may be formatted as follows:

[{'esigner_id': 1001, type: 'signature', x1: 300, x2: 900, y1: 900, y2: 1000}, {'esigner_id': 1001, type: 'date', x1: 1000, x2: 1600, y1: 900, y2: 1000}, {'esigner_id': 1002, type: 'signature', x1: 300, x2: 900, y1: 1100, y2: 1200}, {'esigner_id': 1002, type: 'date', x1: 1000, x2: 1600, y1: 1100, y2: 1200}
. . . .
]

In one embodiment, three libraries are used to positively identify signature lines, date lines, text lines, initials lines, checkboxes, and radio buttons.

1) The open source computer vision library OpenCV may be used to analyze the images of each page in the electronic-sign package to identify lines and shapes that are potential signature lines, date lines, text lines, initials lines, checkboxes, and radio buttons. The LineSegmentDetector function may be used for detecting line segments (as potential signature lines, date lines, initials lines, and text lines). A number of functions may also be used for finding line segments such as Canny Edge detector and a Hough Lines algorithm. The result of this algorithm may lead to many false positives (noise and multiple line segments for the same line in the image). Therefore, custom post-processing steps are used to remove or adjust them. In one embodiment, a combination of the Canny Edge detector, the findContours, and the boundingRect functions are used to identify shapes that could potentially be squares that need to be annotated as checkboxes or radio buttons.

2) To positively identify lines and boxes that need to be annotated from ones that do not (false positives), one may use the OCR tool Google Cloud Vision® to determine the local text just to the left, to the right, above and below each line or box. Through testing the electronic document generator 142 has been configured to identify (given the type of document) what and where the text should be near signature lines, date lines, text lines, initials lines, checkboxes and radio buttons. For the majority of signature lines, the name of the signer is underneath and for the majority of date lines, the word "Date" is found nearby. However, in many other cases, the electronic document generator 142 looks for other specific phrases to positively identify a line/square as a signing item (e.g., "Borrower", "Veteran", etc.).

3) There are several reasons why the text near signature lines, date lines, text lines, initials lines, checkboxes, and radio groups may not be 100% matches to what is expected and therefore leads to missed identification of signing items (false negatives):

a) The name supplied by a customer as input may be a slight variation of what is listed on a document (e.g. Sally Signer vs Sally E. Signer, etc).
   b) Sometimes pages are scans and result in noisy images that are difficult to perform OCR on, leading to mistaken character deletions, insertions or errors.
   c) The OCR library is not 100% accurate at determining the text of an image even if the image is not noisy.

An approximate string matching algorithm is used to compare two text strings to determine a similarity score. For example, one may use the open source tool fuzzywuzzy to determine a similarity score using Levenshtein distance. A similarity score is generated between the nearby text (typically underneath the line) with each of the names of the signers provided as input to the electronic document generator 142. These scores are used to determine if a line is a real signature line and if so, which signer should be associated with the signature line. For example, a page has a signature line with the name "Sally E. Signer" underneath. The electronic document generator receives a list of signers ["Steven Signer", "Sally Signer"]. A similarity score is generated between the text underneath the signature line and each of the signers: "Sally E Signer" with "Sally Signer"=92/100, "Sally E Signer" with "Steven Signer"=59/100. The signer with the highest similarity score is designated as the signer associated for this signing item. In this example, it would be "Sally Signer".

In order for a line to be positively identified as a signature line, the text found underneath must have a similarity score above a threshold with at least one of the signers' names provided as input. This threshold has been identified through testing.

Given the document class and page number within the document class of each page, a rule-based system determines which annotation function to use. Most document classes fall into one of a few general case scenarios where a common function is applied to annotate the page. However, in many cases custom annotation functions are required that are specific to each document type.

Figure 3:
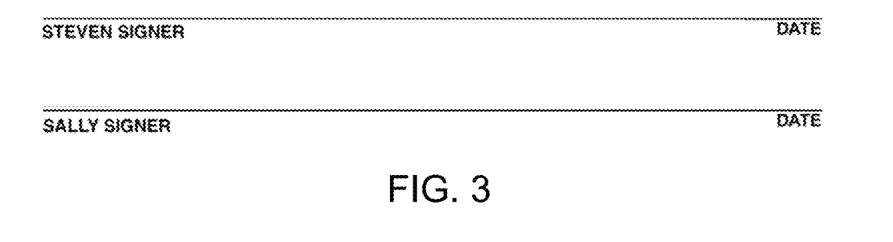
FIG. 3 illustrates a first form of signature line processed in accordance with an embodiment of the invention.
Figure 4:
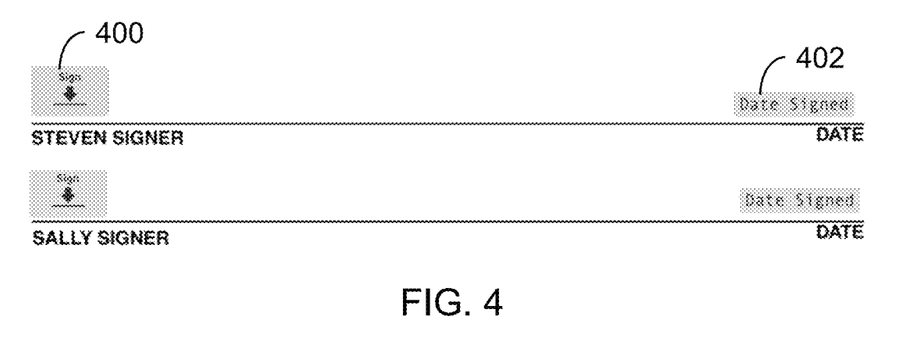
FIG. 4 illustrates an electronic signature line produced for the first form of signature line.

Consider the document segment shown in FIG. 3. The page contains two signature/date lines with text below each line, the signer's full name (left aligned) and the word "Date" (right aligned). This page should be annotated to include both a signature line signing item and a date line signing item for each signature/date line. Each signing item should also include the electronic-signer identification (esigner_id) to indicate which signer the item applies to. FIG. 4 illustrates an exemplary signature line signing item 400 and date line signing item 402.

Figure 5:
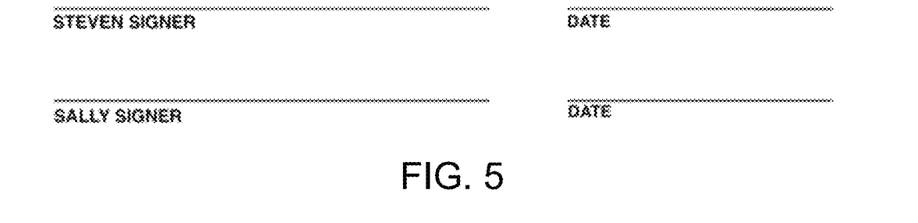
FIG. 5 illustrates a second form of signature line processed in accordance with an embodiment of the invention.
Figure 6:
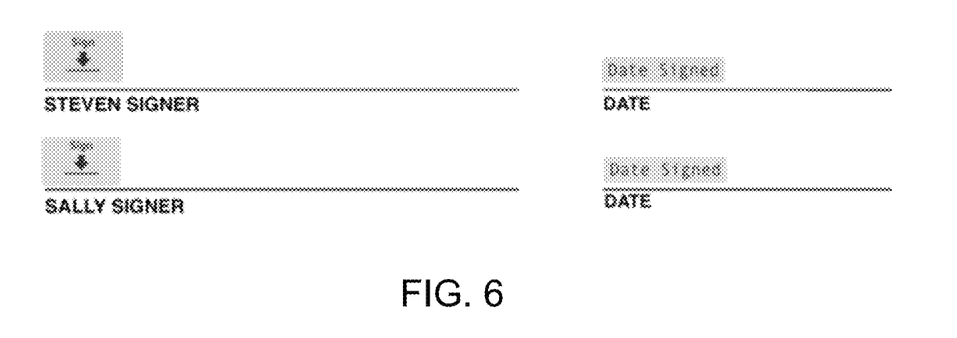
FIG. 6 illustrates an electronic signature line produced for the second form of signature line.

FIG. 5 illustrates a page that contains a signature line with the signer's full name underneath. To the right of the signature line is a date line with the text "Date" underneath. This page should be annotated to include a signature line signing item for each signature line and a date line signing item for each date line, as shown in FIG. 6. Additionally, each signing item should include the electronic-signer identification (esigner_id) to indicate which signer the item applies to.

Figure 7:
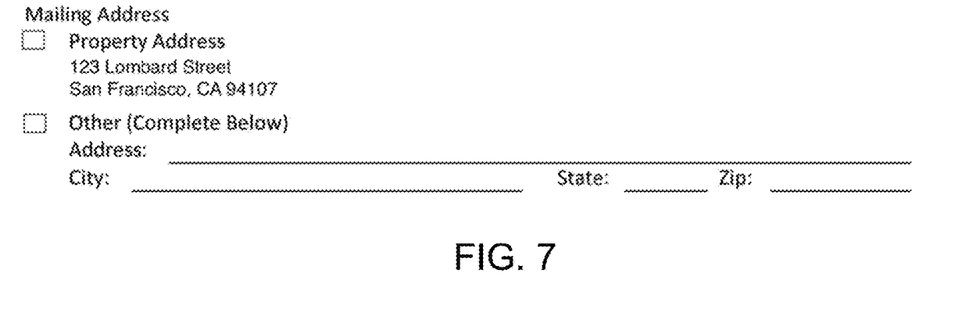
FIG. 7 illustrates signing items with conditional logic processed in accordance with an embodiment of the invention.
Figure 8:
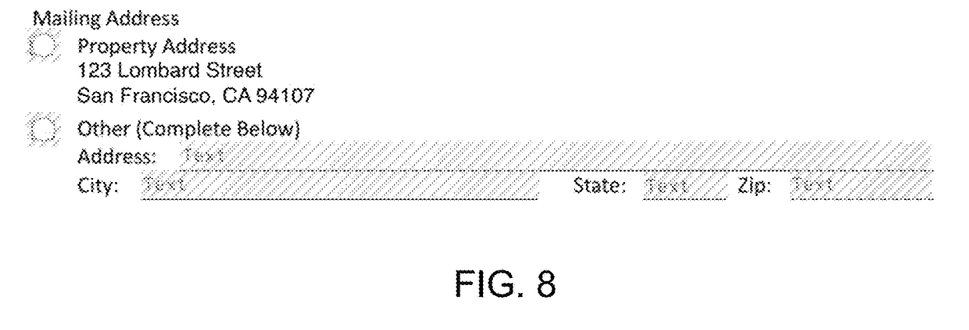
FIG. 8 illustrates signing items that are responsive to a condition selection.

FIG. 7 illustrates a page that requires a customized annotation function. The figure shows a mailing address form that includes squares that should be annotated as radio-button signing items and lines that should be annotated as text line signing items. Additionally, there should be conditional logic linking the text line signing items with the radio-buttons signing item. In this case, the text line signing items should only be visible if the "Other" radio-button signing item is selected, in which case the page may be configured to look like FIG. 8.

To identify the radio buttons, the electronic document generator 142 searches for squares with the text "Property Address" and "Other" to the right of the squares. To identify text lines, it also searches for lines with the text "Address", "City", "State", and "Zip" to the left of the lines. The location coordinates of these signing items along with conditional logic that the text fields should only be visible if the "Other" radio button is selected is then passed as output. More particularly, this information is included with the metadata associated with the first electronic document.

Figure 9:
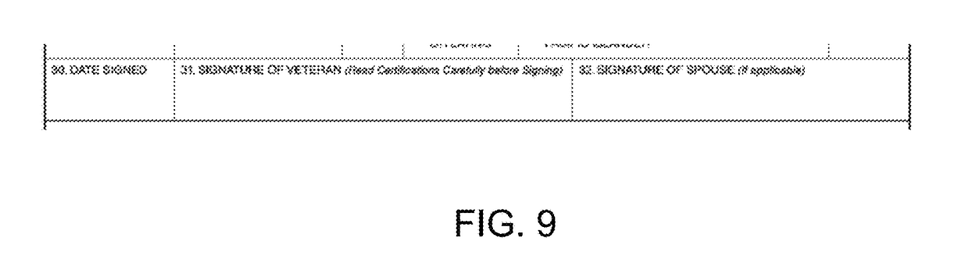
FIG. 9 illustrates a blank signature line processed in accordance with an embodiment of the invention.
Figure 10:
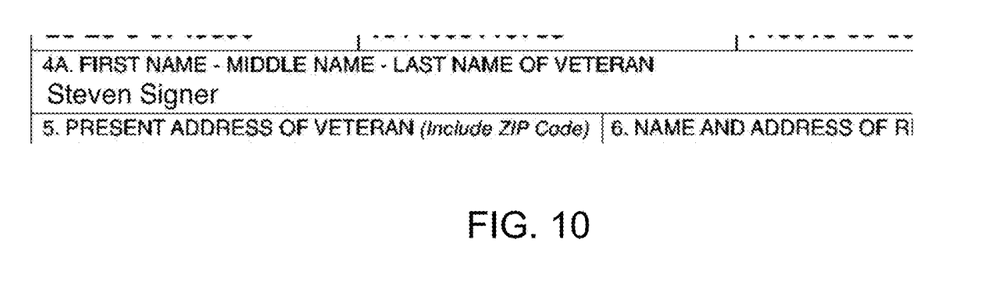
FIG. 10 illustrates a populated signature produced in accordance with an embodiment of the invention.

Consider the document segment of FIG. 9. The signature line does not include the names of the signers or co-signers. In this case, lines with the text "SIGNATURE OF VETERAN" and "SIGNATURE OF SPOUSE" above are used to identify the location of the signature signing items. However, the names of either signers cannot be found on the page. To determine who is the veteran, the electronic document generator 142 searches another portion of the document for lines with the text "NAME OF VETERAN" above, as shown in FIG. 10. Once these lines are found, the electronic document generator 142 performs OCR on the region above the lines to identify who is the veteran (e.g. "Steven Signer").

Figure 11:
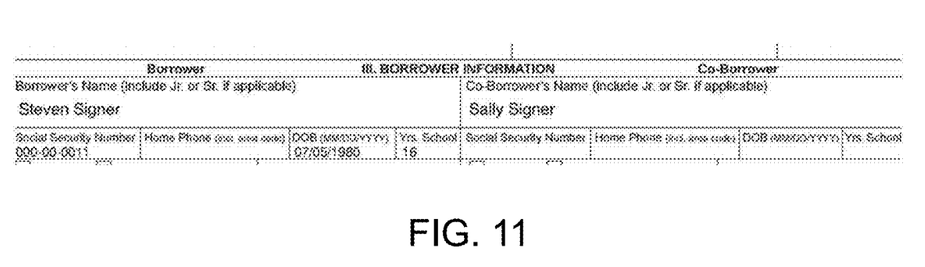
FIG. 11 illustrates a signature line processed in accordance with an embodiment of the invention.
Figure 12:
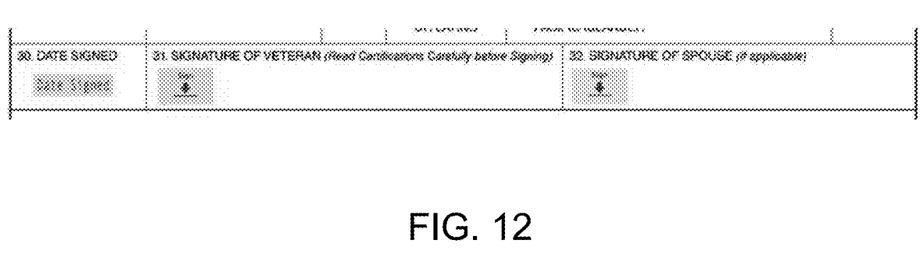
FIG. 12 illustrates an electronic signature line produced in accordance with an embodiment of the invention.

To determine the name of the veteran's spouse, the electronic document generator 142 performs OCR on specific regions of another page of the document. FIG. 11 shows how this information is displayed. Generator 142 searches for lines with the text "Borrower" and "Co-Borrower" underneath, and then performs OCR on the regions below those lines to identify the names of potential spouses. At this point, the electronic document generator 142 has enough information to annotate the page, as shown in FIG. 12.

It should be noted that many OCR tools, such as Google Cloud Vision® can identify the coordinates of text strings in addition to the text strings themselves in an image. It is therefore possible to achieve the same results using a variation of the process outlined above. For example, OCR can be used to first identify text strings of a page as well as each text string's coordinates on the image. Those text strings could be filtered for potential matches to borrowers' names. One may then use computer vision software tools to search for horizontal lines around the regions of the image containing potential borrower name matches to identify signature lines.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter.

For example, an embodiment of the invention may be implemented using JAVA), C++, or other programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus, comprising:
   a network interface circuit connected to a network;
   a bus connected to the network interface circuit; a processor connected to the bus; and
   a memory connected to the bus, the memory storing instructions executed by the processor to:
   receive an electronic document from the network,
   derive individual pages within the electronic document,
   convert the individual pages into image processing segments,
   process the image processing segments with an optical character recognition tool to generate classification data including signature items and text strings,
   classify the electronic document based upon the classification data,
   programmatically, without user input, characterize each of the signature items as one of an electronic-sign signature item or a wet-sign signature item to form a collection of electronic-sign signature items and a collection of wet-sign signature items,
   programmatically, without user input, produce a first electronic document with pages from the electronic document that have the collection of electronic-sign signature items and a second electronic document with pages from the electronic document that have the collection of wet-sign signature items,
   augment the first electronic document with metadata characterizing locations of the electronic-sign signature items,
   supply the first electronic document to the network for delivery to a machine supporting an electronic signing service and
   send the second electronic document to the network for delivery to a client machine.

2. The apparatus of claim 1 wherein the metadata includes a signing item type.

3. The apparatus of claim 1 wherein the metadata includes identification of a signer.

4. The apparatus of claim 1 wherein the metadata includes conditional logic associated with a signing item.

* * * * *